United States Patent

[11] 3,617,745

| [72] | Inventor | John C. Reed |
| | | Santa Barbara, Calif. |
| [21] | Appl. No. | 38,821 |
| [22] | Filed | May 19, 1970 |
| [45] | Patented | Nov. 2, 1971 |
| [73] | Assignee | The United States of America as represented by the Secretary of the Army |

[54] PHOTOMETER RADIOMETER IRRADIANCE REFERENCE SOURCE
1 Claim, 3 Drawing Figs.

[52] U.S. Cl. .................................................. 250/83.3 H,
73/1 F, 73/355 EM, 250/203
[51] Int. Cl. ........................................................ G01g 5/10
[50] Field of Search ............................................ 250/83.3 H,
203; 73/355 EM, 1 F

[56] References Cited
UNITED STATES PATENTS
3,519,352  7/1970  Engborg ........................ 250/83.3 H X
3,287,956  11/1966  Dreyfus et al. ................. 73/1 F Primary Examiner—James W. Lawrence
Assistant Examiner—Morton J. Frome
Attorneys—Harry M. Saragovitz, Edward J. Kelly, Herbert Berl and Aubrey J. Dunn ABSTRACT: An improved photometer radiometer for use in detecting targets in clear nighttime sky in which a conventional supercooled irradiance reference source is replaced with a reflective mirror operating at ambient temperature. The mirror is positioned to rereflect irradiance from a supercooled photometer detector back into the detector. The mirror will rereflect an irradiance back into the detector according to the natural irradiance emitted from the supercooled detector, and thus the mirror appears as a supercooled irradiance reference source. The improvement further includes an infrared reference source that is adaptable for emitting a range of irradiances. The source is positioned behind a small hole in the center of the mirror for combining its irradiance with the rereflected irradiance from the cooled detector. A constant speed reflective chopper blade alternately switches the combined irradiances with incoming background irradiance within the field of view of the radiometer for comparison in the photometer detector. The irradiances will null the output of the detector when no target is within the field of view of the radiometer in clear nighttime sky. After the radiometer output is nulled, irradiance from a target may be measured with extreme accuracy.

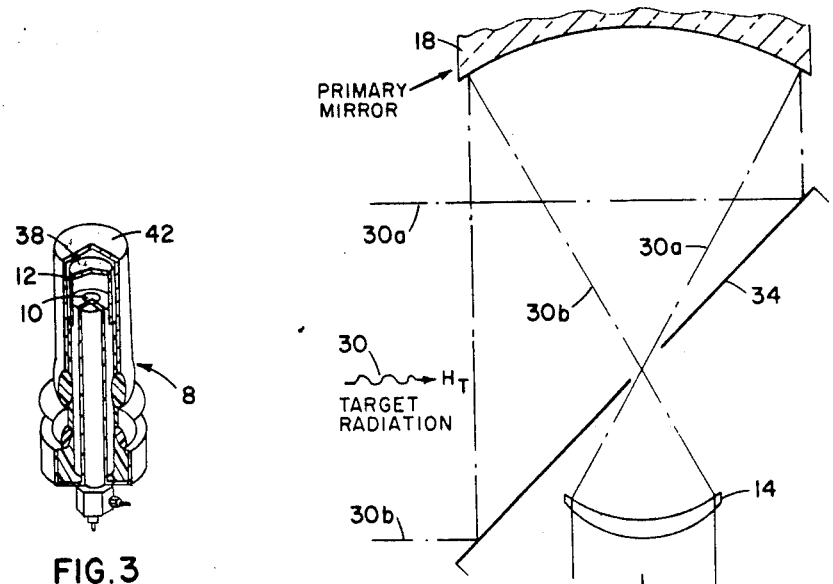
FIG. 3
FIG. 1
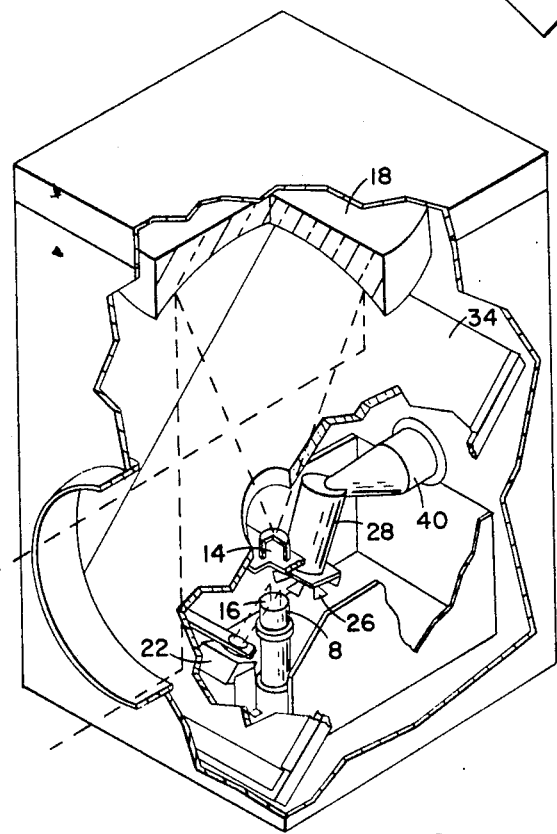
FIG. 2
John C. Reed,
INVENTOR
BY

PHOTOMETER RADIOMETER IRRADIANCE REFERENCE SOURCE

BACKGROUND OF THE INVENTION

This invention is in the field of balancing internal optical emission within a background-limited infrared photometer radiometer and providing a reference source irradiance that is equal to the background irradiance within the field of view of the radiometer. Radiometers are known that compare background irradiance with a known blackbody irradiance source in which the source is supercooled to less than equipment ambient temperature. Frosting of the supercooled source is a problem using these methods. Even when frosting is solved by placing the supercooled source in a dewar, the radiometer has to be enlarged to contain the dewar.

A colder than ambient reference source is necessary for the operation of a background-limited infrared photometer radiometer. One need for this colder than ambient reference source is the dynamic range of the radiometer. The sensitivity of a typical background-limited radiometer is $10^{114}$ watts per square centimeter with a dynamic range of $10^6$. Under these conditions the difference between cold nighttime sky background irradiance and irradiance from an ambient reference source would cause the output of the radiometer to exceed the equipment dynamic range. This is assuming the ambient temperature of the radiometer is 300° Kelvin or warmer. At these temperatures the reference source must be cooler than ambient temperature.

In normal usage of the background-limited radiometer, irradiance from a reference source is adjusted to balance background irradiance, which is usually from nighttime sky, such that there is 0 output before viewing a target. The $10^6$ dynamic range of the radiometer is sufficient to accommodate the signal levels from predicted targets without saturating the output of the equipment. The dynamic range of the radiometer is calibrated so that any signal level within the $10^6$ range will indicate a known irradiance. For example, reentry bodies are usually small and are detected from a long distance, therefore, the detected signal may be only of threshold level even though the target is very hot. An aircraft at close range can easily cause a larger signal than the reentry target at a long distance. Radiometer outputs must, therefore, be correlated with the target size, range and the field of view of the radiometer to be meaningful.

In a high performance absolute radiometer, a high percentage of the radiance as seen by the detector is due to internal optical emission. The radiometer calibration, therefore, depends upon balancing out the optical emission in a manner that makes the calibration insensitive to the ambient temperature of the radiometer.

An ambient temperature mask surrounding the mirror, which is a part of this invention, is set to add an amount of radiance in a reference source optical path that balances with the greater optical emission radiance from a target optical path. Once the mask is set, any change in ambient temperature will not unbalance emission between the two optical paths.

This invention avoids cooling methods or enlargement of the radiometer by using a mirror surrounded by an ambient temperature mask for first balancing internal optical emission and having a variable range infrared irradiance reference source behind a small hole in the center of the mirror for nulling background irradiance. The mirror re-reflects irradiance from the supercooled photometer detector back to the detector, along with a chosen amount of irradiance from the infrared reference source that is needed to null the radiometer output. The inventive reflective mirror and infrared reference source appear as a supercooled reference source.

SUMMARY OF THE INVENTION

A reflective mirror and variable range infrared irradiance reference source for nulling the output of a photometer detector radiometer. An ambient temperature mask, forming a part of this invention, surrounds the mirror and is first set to balance internal optical emission within the radiometer such that any temperature variation within the radiometer will not upset this balance. The infrared reference source is enclosed in a V-shaped insulated container having a magnesium fluoride window placed over the open portion of the V so that irradiance can emanate therethrough. The window is positioned behind a small hole in the center of the mirror. The mirror is positioned to re-reflect irradiance from the supercooled photometer detector back into the detector and, therefore, the mirror itself appears as a supercooled reference source. Irradiance emanating from the infrared reference source through the window and hole in the center of the mirror is combined with detector irradiance re-reflected from the mirror. A constant speed reflective chopper blade alternately switches these combined irradiances with incoming background irradiance within the field of view of the radiometer for an absolute comparison by the photometer detector. Irradiance from a variable range infrared reference source, such as an electrically heated insulated copper bar, is varied by applying current through heater coils surrounding the copper bar. The reference source irradiance is set such that the combined irradiances will null the output of the detector when no target is within the field of view of the radiometer in clear nighttime sky. The radiometer can then detect irradiance from a target with extreme accuracy.

BRIEF DESCRIPTION OF THE DRAWINGS

FIG. 1 is a schematic diagram of radiometer optics including the inventive mirror and reference source;

FIG. 2 is a cutaway drawing of the radiometer optical assembly and related parts; and FIG. 3 illustrates a blown-up view of the detector package assembly.

DESCRIPTION OF THE PREFERRED EMBODIMENT

Referring to FIG. 1, internal optics of a typical photometer radiometer are shown including the inventive reflective source mirror 20 with ambient temperature mask 24 and irradiance reference source 22. Reflective mirror 20 is positioned so that irradiance from photometer detector 10, supercooled to about 65° Kelvin, passes through first relay lens 16, off a tooth on reflective chopper blade 26 and onto the reflective surface of mirror 20. This irradiance is re-reflected off mirror 20 back through the same optical path into detector 10. This optical path is designated the reference source optical path. A second optical path, designated the target optical path, includes flat mirror 34, parabolic mirror 18, second relay lens 14, openings between teeth on reflective chopper blade 26 and first relay lens 16. A synchronous motor 28 turns reflective chopper blade 26 at a constant speed. Blade 26 has teeth and openings therebetween that are evenly spaced for alternately switching the field of view of detector 10 between the reference source optical path and the target optical path.

In a high performance absolute radiometer, a high percentage of the radiance as seen by detector 10 is due to internal optical emission as compared to radiance from an unknown target, which unknown target radiance is designated by numeral 30 in FIG. 1. This internal optical emission must be balanced between the reference source optical path and the target optical path in such a manner that the calibration is insensitive to any change in the ambient temperature of the radiometer. The ambient temperature mask is a means of balancing the emission from the two optical paths so that emission from the paths cancel even with changes in ambient temperature. The proper size of mask 24 is based upon optical emissivity from the two optical paths. The size of mask 24 and the aperture between the mask and mirror 20 may be determined by experimentation while reflective chopper blade 26 is rotated at a constant speed. The output of photometer detector 10 will be 0 when emission in the two optical paths cancel. This balance of optical emission will remain even at varying ambient temperatures. In FIG. 1, W1 represents optical emission in the target optical path, while W2 is emission from mirror 20 and W3 is the balancing emission from ambient temperature mask 24. The balance, of course, is when $W1 \times W2 + W3$.

The radiometer is usually used for tracking targets in clear nighttime sky. While the optical emission may be balanced in the laboratory, the clear nighttime sky background irradiance within the field of view of the ratiometer must be balanced under the environment in which the radiometer will be used. Assuming that the ambient temperature within the radiometer is 300° Kelvin or warmer, clear nighttime sky background irradiance would cause the output of the radiometer to exceed its dynamic range. The inventive mirror 20 and irradiance reference source 22 are used to null the output of the radiometer when the background is cooler than the ambient temperature of the radiometer. With the ambient temperature of the radiometer above 300° Kelvin, the reference source must be cooler than ambient. When the reflective source mirror 20 is viewing the supercooled detector 10 by reflection off a tooth of chopper blade 26, the detector irradiance re-reflected from mirror 20 is very small. This small irradiance as seen by detector 10, causes mirror 20 to appear much cooler than if the irradiance had come from a nonreflective ambient surface. An additional irradiance from reference source 22 is, therefore, needed to null the output of the radiometer when viewing a clear nighttime sky background prior to detecting target irradiance.

Refer to FIGS. 1 and 3 for illustrating detector package 8. The package includes a photometer detector 10, a geometric shield 12, and an optical filter 38, all operating at cryogenic temperatures, such as 65° Kelvin. Photometer detector 10 may be a photoconductive indium antimonide detector having a peak detectivity sensitivity of $2 \times 10^{11}$ cm. $(Hz.)^{1/2}watt^{11}$. The natural irradiance from the indium antimonide detector 10, operating at 65° Kelvin, passes through radiantly transparent window 42. With the reflective chopper blade 26 turning at a constant speed, the natural irradiance from the detector operating at 65° Kelvin is much less than the amount of irradiance needed to null the output of the radiometer when viewing irradiance from the cold nighttime sky. An irradiance reference source 22, such as an insulated copper bar is, therefore, enclosed within V-shaped insulated container 21 having a magnesium fluoride window 19 over the open part of the V for furnishing a variable range of irradiance through the opening of the V. The irradiance reference source is positioned behind the opening in reflective mirror 20. The insulated copper bar is heated by some means, such as passing current through heating coils surrounding the copper bar. The magnesium fluoride window 19, placed over the open portion of the V, insulates the heated copper bar 22 from any cooling air currents. Irradiance is emanated through window 19 and out the opening in mirror 20. Current is passed through the heating coils until an irradiance emanated from the copper bar that is combined with re-reflected irradiance from the mirror is equal to background irradiance. The output of detector 10 will indicate 0 at this point.

The irradiance from a target, such as a reentry body in clear nighttime sky, is then measured with extreme accuracy. Incoming target radiation 30 is reflected off flat mirror 34 onto parabolic mirror 18 and re-reflected back through an opening in the center of flat mirror 34, second relay lens 14, the openings between the teeth on constant speed reflective chopper blade 26, first relay lens 16 and into photometer detector 10. Reflective mirror 20 and the portion of insulated container 21 are at ambient temperature of the radiometer. The ambient temperature range of the radiometer in which the insulated copper bar has operated successfully in from 290° to 325° Kelvin. The electronic equipment connected at the output of detector 10 is conventional and operates at the frequency of the chopped signal input to the detector. A typical frequency of the chopper signal through chopper blade 26 is 1 kilocycle per second.

FIG. 2 illustrates a cutaway drawing of a typical radiometer in which the inventive reflective mirror and infrared reference source is used. This unit uses a Pfund pierced mirror optical system having a $f/1.2$ 12-inch diameter parabolic mirror 18. A 1:1 relay optical system includes first relay lens 16 and second relay lens 14. Lenses 14 and 16 are Irtran-2 aspheric lenses having a focal length of 0.8 inch. The collimated optical beam between the relay lenses are chopped by the reflective chopper blade 26. An air blower in housing 40 keeps hot air removed from synchronous motor 28.

While a specific embodiment of the invention has been shown and described other embodiments may be obvious in light of the above disclosure.

I claim:
1. An improved photometer radiometer for detecting a target comprising:
 a supercooled photometer detector;
 a target optical path for transmitting target irradiance into said detector;
 a reference source optical path for transmitting reference source irradiation to said detector;
 a motor driven constant speed reflective chopper blade having teeth and openings therebetween that are of equal size with the teeth and evenly spaced for alternately switching target and reference optical paths;
 said reference optical path including said detector as the reference source irradiance, the chopper blade, and a parabolic mirror for reflecting said detector irradiance back to the chopper blade and then to the detector;
 a mask in said reference optical path, whereby the two optical paths may be nulled by adjustment of said mask wherein said parabolic mirror in said reference optical path is provided with an aperture at its center;
 a secondary adjustable reference source of irradiance mounted behind said mirror in alignment with said aperture; whereby adjustment of the temperature of said secondary source of irradiance nulls the effect of background irradiance in said target optical path.

* * * * *